United States Patent [19]
Yoo

[11] Patent Number: 5,421,433
[45] Date of Patent: * Jun. 6, 1995

[54] ELEVATOR LOAD-WEIGHING AT CAR HITCH

[75] Inventor: Young S. Yoo, Avon, Conn.

[73] Assignee: Otis Elevator Company, Farmington, Conn.

[*] Notice: The portion of the term of this patent subsequent to Dec. 22, 2009 has been disclaimed.

[21] Appl. No.: 165,561

[22] Filed: Dec. 10, 1993

Related U.S. Application Data

[63] Continuation of Ser. No. 792,972, Nov. 15, 1991, abandoned.

[51] Int. Cl.⁶ .............................................. G01G 19/18
[52] U.S. Cl. ..................... 187/391; 177/231; 177/168
[58] Field of Search .............. 187/131, 130, 391, 392; 177/168, 212, 263, 231, 232, 225, 147, 132

[56] References Cited

U.S. PATENT DOCUMENTS

| | | | |
|---|---|---|---|
| 4,479,560 | 10/1984 | Day | 177/147 |
| 4,793,442 | 12/1988 | Heckler et al. | 187/115 |
| 4,899,852 | 2/1990 | Salmon et al. | 187/1 R |
| 5,046,584 | 9/1991 | Yoo et al. | 187/1 R |
| 5,149,922 | 9/1992 | Kondou | 187/131 |
| 5,172,782 | 12/1992 | Yoo et al. | 177/147 |

FOREIGN PATENT DOCUMENTS 3-98976  4/1991  Japan .................................. 187/105

*Primary Examiner*—Steven L. Stephan
*Assistant Examiner*—Robert Nappi

[57] ABSTRACT

The invention obtains the weight of an elevator car in a manner which is minimally dependent on the distribution of the load within the cab by means of a load cell and support sandwiched between a first and second plate, the load being shared between the load cell and support. Threaded rods pass through the first and second plates, as well as through a space between the first and second plates, and further pass through hitch springs and support the car. The upper ends of the rods are connected to the hoist ropes. The load weighing apparatus further includes a pair of rod positioners which keep constant the lateral displacement of the rods one from another. The load cell and support are not enclosed by the rods, yielding the further advantage that a mechanic has easy access to the load cell for its maintenance.

2 Claims, 3 Drawing Sheets

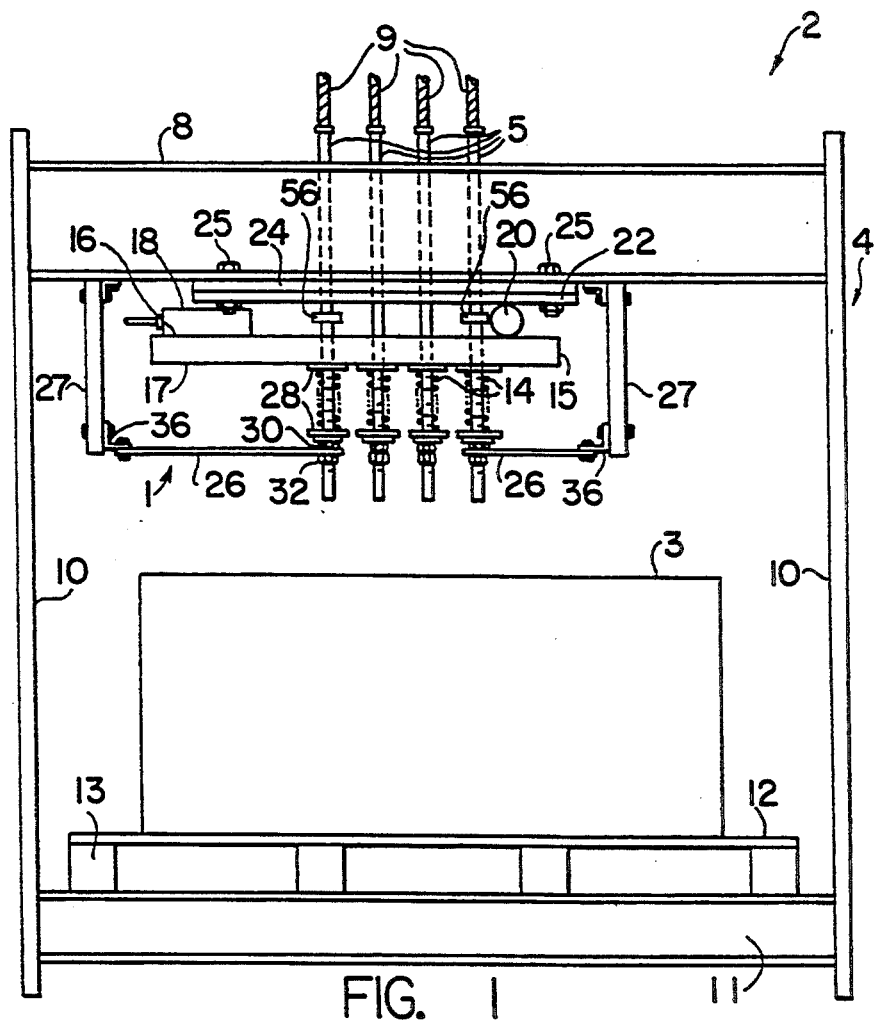
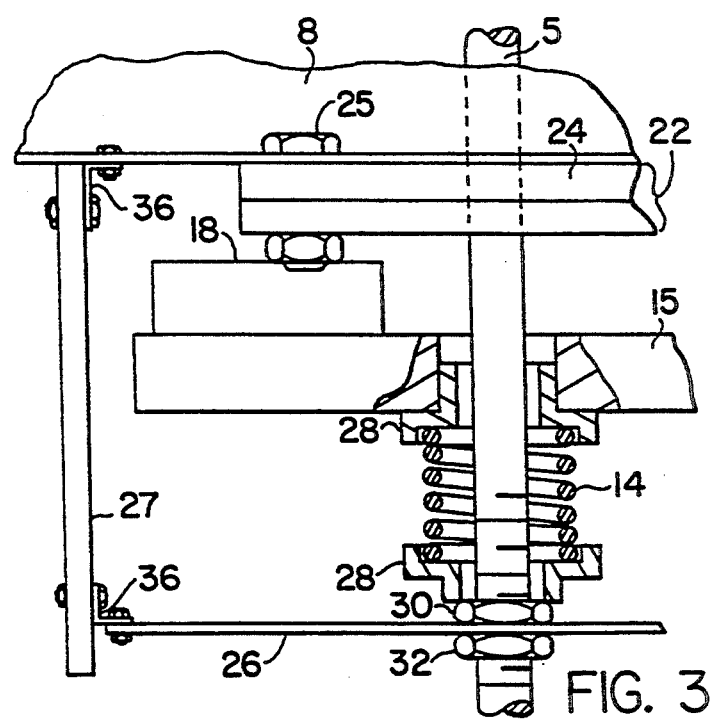

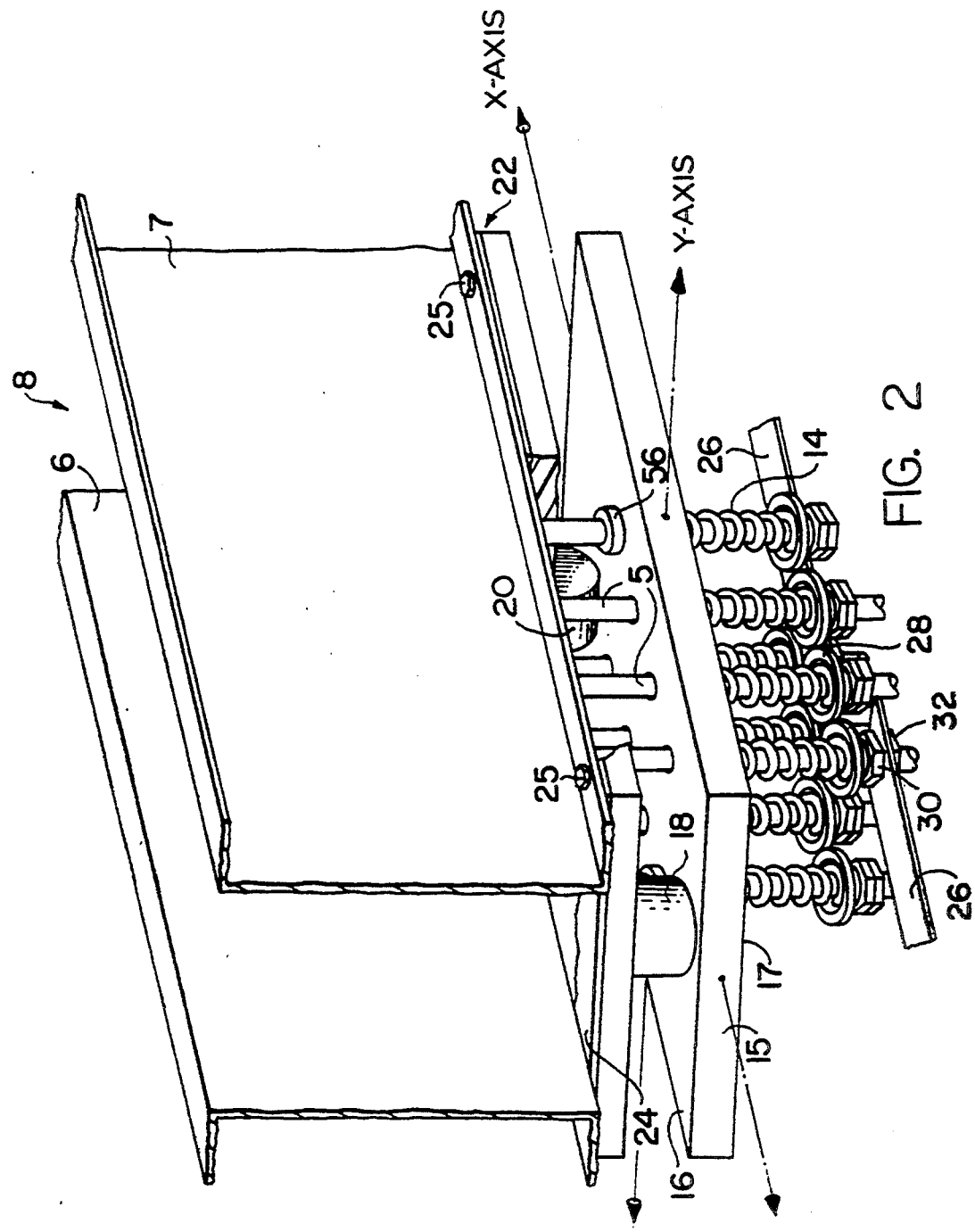

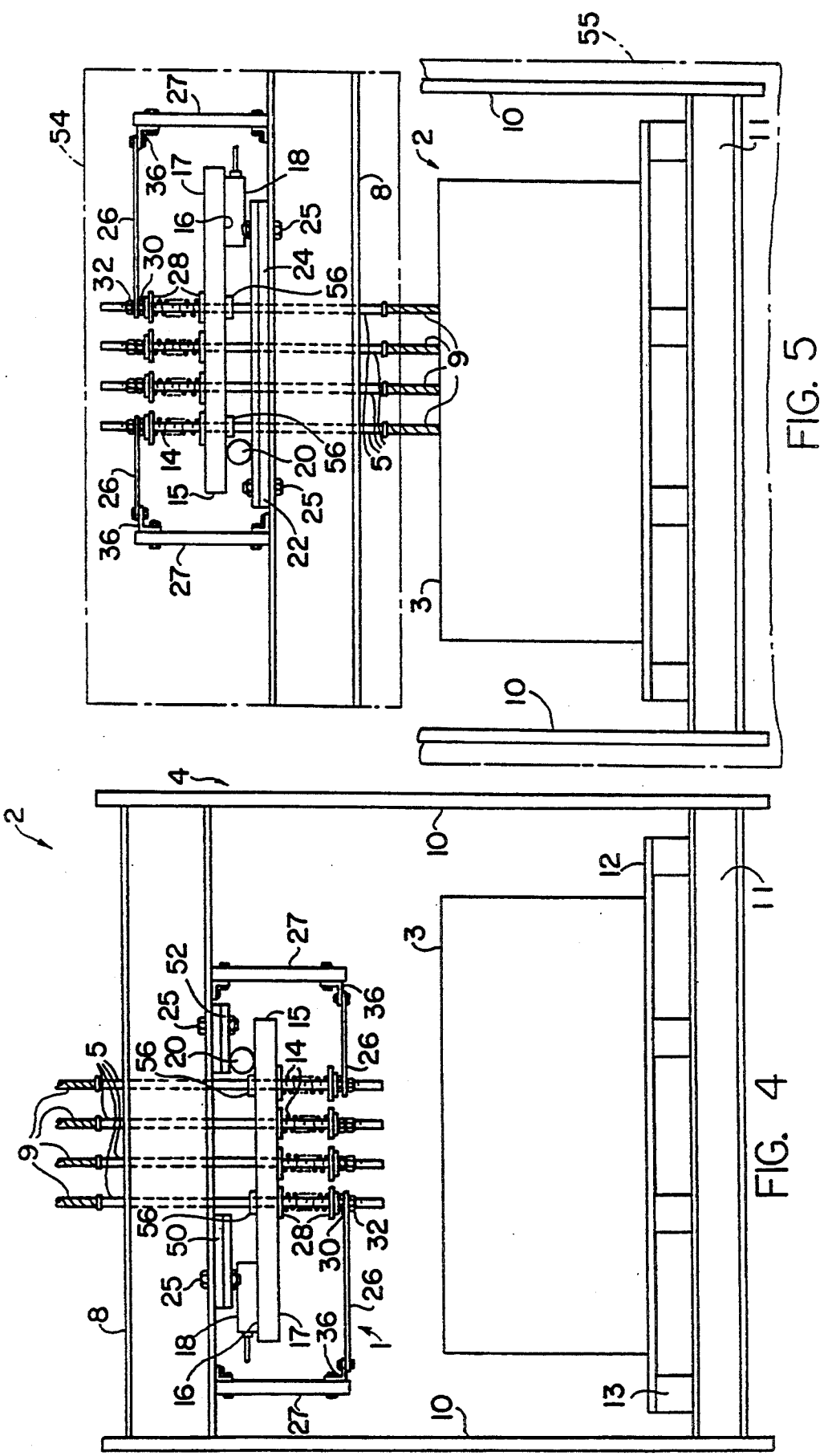

ELEVATOR LOAD-WEIGHING AT CAR HITCH

This application is a continuation of application Ser. No. 07/792,972, filed Nov. 15, 1991, now abandoned.

TECHNICAL FIELD

This invention relates to the weighing of an elevator car, the car including a cab and a frame.

BACKGROUND ART

It is important to the function of an elevator that its load be known at all times—whether to determine if the car is overloaded so that the elevator brake is not released while under that load or to determine which floor should be serviced based of the load in the car. Several types of elevator load weighing systems have been used.

Elevator load weighing systems may be divided into two groups: those that place a sensor beneath the cab platform and those that do not.

Several systems have been designed with the load weigher beneath the car. Some measure the deformation of resilient pads beneath the car platform, U.S. Pat. No. 4,078,623. A disadvantage of the deformation systems is the inaccuracy introduced by hysteresis in the elastomeric material used in the pads. U.S. Pat. No. 4,899,852 discloses an elevator car disposed in a frame which moves on rails through a hoistway; a pendulum mount is used to mount the car in the frame so that the car is free to swing from four suspension rods within the frame in pendulum fashion. Two of the four suspension rods extend through a support pad and a rubber pad and a second support pad. Below two corners of the car, a load cell separates the support pads. This device involves deflection in the load cell in response to weight on the cab floor. There is no positive connection between the load cell and the support pads. The two support pads sandwich the rubber pad. There are several problems. First, there is signal drift due to hardening of the rubber pads. Typically, the platform is supported at some places by wooden blocks and rubber pads and at other places by load cells supported by rubber pads. But the hardness of the rubber pads increases from the time the elevator is installed. And, the hardness of different rubber pads increases at different rates, such that the load evenly distributed on a cab platform is not carried equally by different pads. In addition, accurate load measurement requires that the load cells and rubber pads should be under uniform pressure; achieving this is time consuming and difficult. Further, the load weight signal measurement typically depends on a linear relationship, over the range of weights to be measured, between deflection of a load cell and a load of, for example, 0 to 3000 pounds. On installation, the relationship may be linear but because of the aging of the rubber pads, it becomes nonlinear for a portion of the range of weights to be measured. The result is an erroneous load measurement. When the error in the load measurement becomes excessive the use of the load weigher is undermined almost totally. For example, if the average elevator passenger weighs 150 pounds and the range is 0 to 3000 pounds, the resolution error may be greater than 5% so that it cannot be determined whether or not one person is in the car. Frequently, adolescents will get on an elevator and press all the buttons. Anti-nuisance software estimates the number of people in a car by assuming an average weight per person. It then determines the number of car calls and if the number of car calls exceeds the number of people estimated, it cancels those car calls. If a load weigher cannot distinguish the weight of an average person, this software cannot operate. A further problem with platform load weighing devices is that, even if the load cells are initially installed to equally share the load, different measurements are later obtained depending on the location of the load on the platform because of the hardening of the rubber pads.

It is desirable to weigh the load of the car under any load distribution. U.S. Pat. No. 4,793,442 discloses load cells between the top and middle and then middle and bottom plates, one load cell at each corner of an equilateral triangle, the top plate being connected to the crosshead. Bolts extend from the hoistway ropes through the three plates. This solution involves an unnecessary number of load cells and leads to rubbing between the bolts and the plates. The load weighing teaching in U.S. Pat. No. 4,899,852 has too many load cells to make it useful in connection with U.S. Pat. No. 4,793,442.

DISCLOSURE OF THE INVENTION

It is an object of the present invention to obtain the weight in an elevator cab which is minimally dependent on the distribution of the load within the cab by means of a load cell and support sandwiched between a top hitch plate and a bottom hitch plate, the load being shared between the load cell and support. Threaded rods pass through the top hitch plate and the bottom hitch plate, as well as through a space between the top and bottom hitch plates, and further pass through hitch springs and support the car. The upper ends of the rods are connected to hoist ropes. The load weighing apparatus further includes a pair of rod stabilizers which keep the middle and bottom hitch plates from excessive rattling. The load cell and support are not enclosed by the rods, yielding the further advantage that a mechanic has easy access to the load cell for its maintenance.

BRIEF DESCRIPTION OF THE DRAWINGS

FIG. 1 is a front view of a first embodiment of a load weighing assembly and car;

FIG. 2 is a perspective view of the load weighing assembly;

FIG. 3 is a front view showing a rod stabilization plate 26 connecting the rod 5 to a load support 8 by means of a bracket 27;

FIG. 4 is a front view of a second embodiment of a load weighing assembly and car; and FIG. 5 shows a third embodiment of the load weighing assembly 1.

DETAILED DESCRIPTION OF THE INVENTION

Referring to FIGS. 1 and 2, a car 2, including a cab 3 and a frame 4, is suspended from threaded rods 5 passing between two parallel beams 6, 7 (FIG. 2) of a load support 8. Each rod 5 hangs from a rope 9. There is a front row and a back row of rods 5, each row containing four rods 5. The front view in FIG. 1 shows only four rods 5. The frame 4 includes two uprights 10, a plank 11, and the load support 8. The cab 3 sits atop a platform 12 which sits on rubber pads 13. The weight of the car 2 biases hitch springs 14 surrounding rods 5 against a bottom hitch plate 15. The bottom hitch plate 15 has a top surface 16 and bottom surface 17. Sitting atop the bottom hitch plate 15 and connected thereto is a load cell 18 and a support 20, positioned on opposite sides of rods 5. Load cell 18 and support 20 are positioned on the same horizontal X-axis (FIG. 2) such that a tension differential between the front row of four ropes and back row of four ropes does not affect the load weight. The weight of the car 2 which causes hitch springs 14 to bear against bottom hitch plate 15 also causes load cell 18 and support 20 to bear against a top hitch plate 22, which is in turn caused to bear against load support 8. Top hitch plate 22 has a top surface and a bottom surface. The top hitch plate 22 includes a sound isolation layer 24 made of rubber. The top hitch plate 22 is secured to the support by nut-bolt combinations 25.

Two rod stabilization plates 26 are made of thin metal and are rigid horizontally, but springy vertically. They prevent excessive movement of rods 5, and further, if there is a tension differential between ropes 9 in the right and left half-planes, it will barely affect the load measurement. Stabilization plates 26 are connected to brackets 27 which connect to the load support 8. The horizontal rigidity ensures that the bottom hitch plate 15 does not twist. The vertical springiness ensures that the load seen by the load cell 18 is not significantly decreased on account of rod stabilization plates 26. The maximum displacement of the hitch spring 14 between full load and no load is approximately one half-inch. The effect on the load measurement caused by rod stabilization plates 26 is two to three pounds.

Protection collars 56 bolted onto rods 5 provide protection against load cell overload when load weighing assembly 1 might otherwise ascend, such as during buffer strikes, safety engagements or even normal elevator acceleration where load cell 18 is loaded near capacity. When the overload occurs, hitch springs 14 compress and collars 56 move upwardly. When protection collars 56 strike the bottom of top hitch plate 22, they provide an auxiliary load path around load cell 18, circumventing damage to load cell 18.

FIG. 3 shows a side view of the bottom hitch plate 15, rod 5, and hitch spring 14. The hitch spring 14 sits in a nylon seat 28 having a recess partially filled by the rod 5 passing through a hole in the bottom hitch plate 15. At one end of the rod 5 near the cab 2, a nut 30 and a second nut 32 sandwich the rod stabilization plate 26. The rod stabilization plate 26 is connected to the load support 8 by means of a bracket 27 and angle 36. The rods 5 are allowed to move very little because most movement is caused to take a path through the seat 28, hitch springs 14, nuts 30, stabilization plates 26, and bracket 27 connected to the support 8.

FIG. 4 shows a second embodiment of a load weighing assembly 1 wherein there are two top hitch plate supports 50, 52 and one bottom hitch plate, the two top hitch plate supports 50, 52 performing the function of top hitch plate 22 in FIGS. 1–3.

FIG. 5 shows a third embodiment of the load weighing assembly 1 wherein the load support 8 is in the elevator machine room 54 for a 2 to 1 roping of the car in the hoistway 55. Various modifications may be made to the specification and drawings without departing from the spirit and scope of the invention. For example, the support 2 is shown in FIG. 20 as cylindrical, but the function is that of a pivot and any pivot support is equivalent to a cylindrical support.

I claim:

1. A load weighing assembly for weighing an elevator car, said load weighing assembly hanging from a plurality of rods, said rods being enclosed by springs, said car having a crosshead, said load weighing assembly comprising:
    (a) a bottom hitch plate having a top surface and a bottom surface and having two or more holes for receiving said rods, on said top surface there being mounted a load cell and a support, said load cell and support each being disposed on opposite sides of said rods for sharing the load of said elevator car;
    (b) a top hitch plate means having a top surface and a bottom surface, said top surface coming to bear against said crosshead when said load cell and said support are brought to bear against the bottom surface of said top hitch plate by the weight of said elevator car upon said rods; and
    (c) at least two homogeneous stabilization plates, each being connected to at least two of said rods and each being connected to said crosshead by means of a bracket.

2. The load weighing assembly of claim 1 further comprising at least two collars around at least two of said rods disposed between said plates for engaging said top hitch plate means thus providing an auxiliary load path around said load cell and circumventing damage to load cell when said load weighing assembly ascends toward said crosshead.

* * * * *